United States Patent

Nagai et al.

[11] Patent Number: 5,119,068
[45] Date of Patent: Jun. 2, 1992

[54] REAR SPOILER FOR USE IN AUTOMOBILE

[75] Inventors: Susumu Nagai, Toyonaka; Koji Mizuta, Osaka, both of Japan

[73] Assignee: Osaka Fuji Kogyo Kabushiki Kaisha, Amagasaki, Japan

[21] Appl. No.: 634,394

[22] Filed: Dec. 27, 1990

[51] Int. Cl.$^5$ .............................................. B60Q 1/44
[52] U.S. Cl. ................................... 340/479; 340/480; 362/63; 362/80
[58] Field of Search ............... 340/479, 482, 487, 480, 340/467; 362/63, 65, 80

[56] References Cited

U.S. PATENT DOCUMENTS

| 3,955,173 | 5/1976 | Martin | 362/38 |
| 4,707,014 | 11/1987 | Rich | 362/65 |
| 4,787,665 | 11/1988 | Rich | 362/65 |
| 4,845,600 | 7/1989 | Matsumura et al. | 340/479 |

FOREIGN PATENT DOCUMENTS 0047793 3/1982 European Pat. Off. ............ 340/479

Primary Examiner—Jin F. Ng
Assistant Examiner—Dov Popovici
Attorney, Agent, or Firm—Burns, Doane, Swecker & Mathis

[57] ABSTRACT

A spoiler to be mounted on rear part of an automobile comprising a movable plate capable of freely opening and closing itself and which forms a part of an upper plate of a main body. A stop lamp is mounted on the movable plate. The movable plate and the stop lamp interlock a foot brake of the automobile so that the movable plate is opened and the stop lamp is lit when driver steps on the foot brake. The stop lamp comes out on the rear spoiler and emits a beam light rearward. When a driver releases the foot brake, the movable plate is closed and the stop lamp is put out.

7 Claims, 4 Drawing Sheets

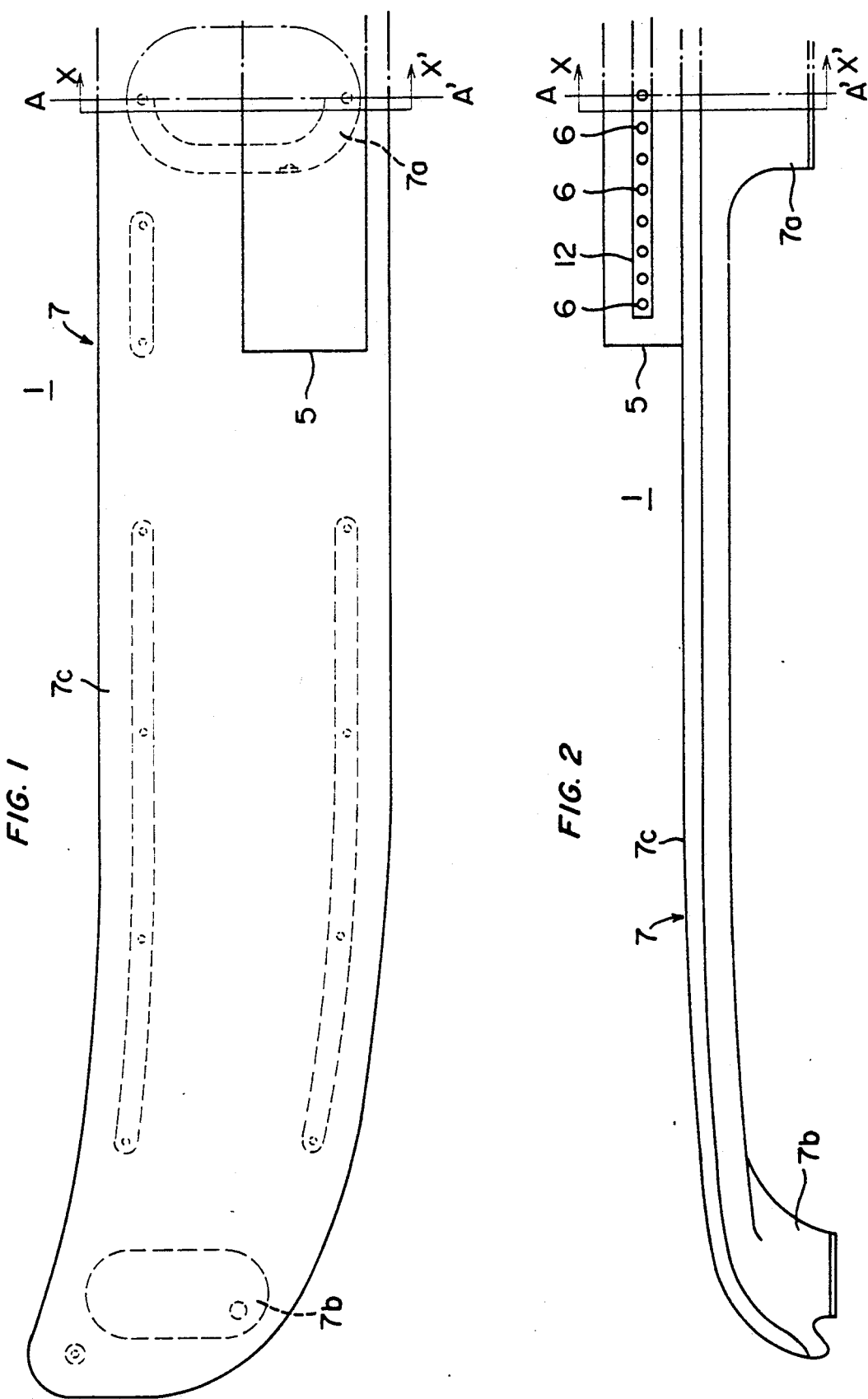

REAR SPOILER FOR USE IN AUTOMOBILE

BACKGROUND OF THE INVENTION

1. Field of the Invention

The present invention relates to a rear spoiler to be mounted on the rear part of an automobile.

2. Description of Related Art

When driving an automobile at high speed, a lifting force is generated by the action of air, whereby the driving force of the automobile is not effectively transmitted to the ground through the tires. To solve this problem, it has been conventional to employ a method in which a rear spoiler is mounted on the upper part of the automobile such as the upper side of a trunk so as to produce a restrictive force for offsetting the lifting force mentioned above.

Recently, certain automobiles have been seen in which stop lamps are built in the rear part of a spoiler so that when the driver steps on the brake, the stop lamps are lit up to make a visual sign of the braking state to the driver of a succeeding vehicle, thus exhibiting a function for preventing the accident of rear-end collision. In such a construction, for the purpose of improving the visual acknowledgement performance of braking of the preceding automobile even under the bright sunshine in the daytime, the stop lamps are usually built in the lower part of a wing of the spoiler. Accordingly, not a small area of the entire area of the rear spoiler wing is obliged to be occupied just for building the stop lamps therein, which unavoidably requires sacrifice or uselessness of aerodynamic characteristic of the wing, being unable to effectively provide the desired down force. Moreover, if the driver's seat of the succeeding vehicle is located at a high position as in a large-sized truck, it is often the case that beam light from the stop lamps is shaded by the spoiler and does not reach the high driver's seat falling into a dead angle, eventually resulting in poor function of the prevention of rear-end collision accident.

SUMMARY OF THE INVENTION

An object of the present invention is, therefore, to provide a rear spoiler for use in an automobile in which driver of a succeeding vehicle can visually acknowledge the beam light from a stop lamp at all times without depending upon the height of the driver's seat, and in which the down force can be effectively provided without sacrifice of aerodynamic force characteristic.

In order to accomplish the foregoing object, the spoiler for use in an automobile in accordance with the present invention comprises a movable plate capable of freely opening and closing itself and which forms a part of an upper plate of a main body. The stop lamp is secured to the inside of the movable plate. The movable plate and stop lamp interlock with a foot brake of an automobile so that the stop lamp is lit upon opening the movable plate, while the stop lamp is put out upon closing the movable plate.

When the driver steps on the foot brake of the automobile, the movable plate interlocking the brake is opened thereby resulting in the stop lamp being lit. In this operation, the stop lamp comes out on the rear spoiler and emits the beam light rearward. As the beam light from the stop lamp is not shaded by the spoiler, the beam light reaches the driver sitting on the high driver's seat of the succeeding vehicle, resulting in successful prevention of rear-end collision accidents. Further, a shadow shading the sunshine is provided by the movable plate, and this shadow is useful for keeping a preferable visibility even under the bright sunshine in the daytime. Furthermore, an unexpected sudden appearance of the movable plate may invite a strong attention to the driver of the succeeding vehicle, and this advantage together with the function of the beam light synergistically causes the driver of the succeeding vehicle to take necessary and appropriate safety operations speedily. Thus, the advantage of preventing the rear-end collision accident can be performed also from this aspect. In addition, upon releasing the driver's foot from the foot brake of the automobile, the movable plate closes and the stop lamp is put out at the same time.

Then, when arranging a rear spoiler for use in an automobile comprising a solenoid actuating to open the movable plate and a damper for cushioning the returning force of the solenoid, the movable plate is instantaneously opened by electromagnetic driving force of the solenoid, while being moderately closed as a result of the cushioning effect of the damper. Accordingly, the possible shock of the movable plate at the time of the returning action may be mechanically reduced, which results in prevention of the movable plate, upper plate, etc. from damage.

BRIEF DESCRIPTION OF THE DRAWINGS

These and other objects and features of the present invention will become apparent from the following description taken in conjunction with the preferred embodiments thereof with reference to the accompanying drawings:

FIG. 1 is a plan view illustrating a left half part of a rear spoiler for use in automobile in accordance with the present invention;

FIG. 2 is a rear view illustrating a left half part of the rear spoiler;

DETAILED DESCRIPTION OF THE PREFERRED EMBODIMENTS

Figure 3:
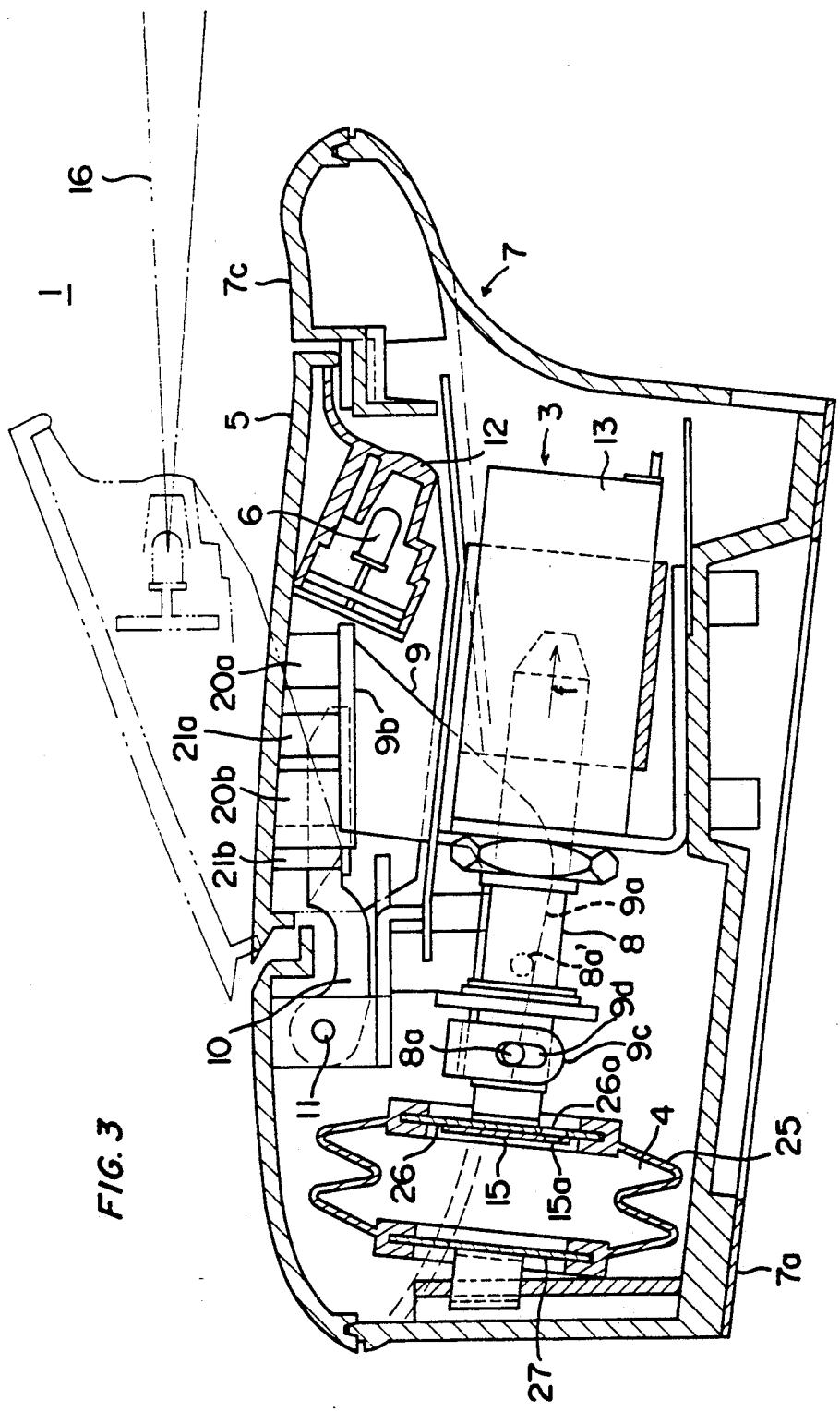
FIG. 3 is a partially vertical sectional view taken along the line X—X' of FIGS. 1 and 2.

FIGS. 1 and 2 both illustrate a left half of a rear spoiler 1. Construction of the rear spoiler 1 is symmetrical about the center line A—A', and in which FIG. 1 is a plan view of the rear spoiler and FIG. 2 is a rear view thereof. The rear spoiler 1 is formed into a wing-shape hollow frame body. A movable plate 5 is mounted on an upper plate 7c of a frame body 7 and located substantially in the middle part of the rear spoiler 1. For mounting the rear spoiler 1, foot parts 7a, 7b of the frame body 7 are placed on the surface of the trunk of automobile in such a manner that the upper side of FIG. 1 coincides with the forward of the automobile. Then FIG. 2 is a view of the movable plate 5 in an open state as seen from rear side, and in which a plurality of stop lamps 6 are arranged in a row on the inside of the movable plate 5 and secured thereto being combined with corresponding lens 12 respectively.

Figure 4:
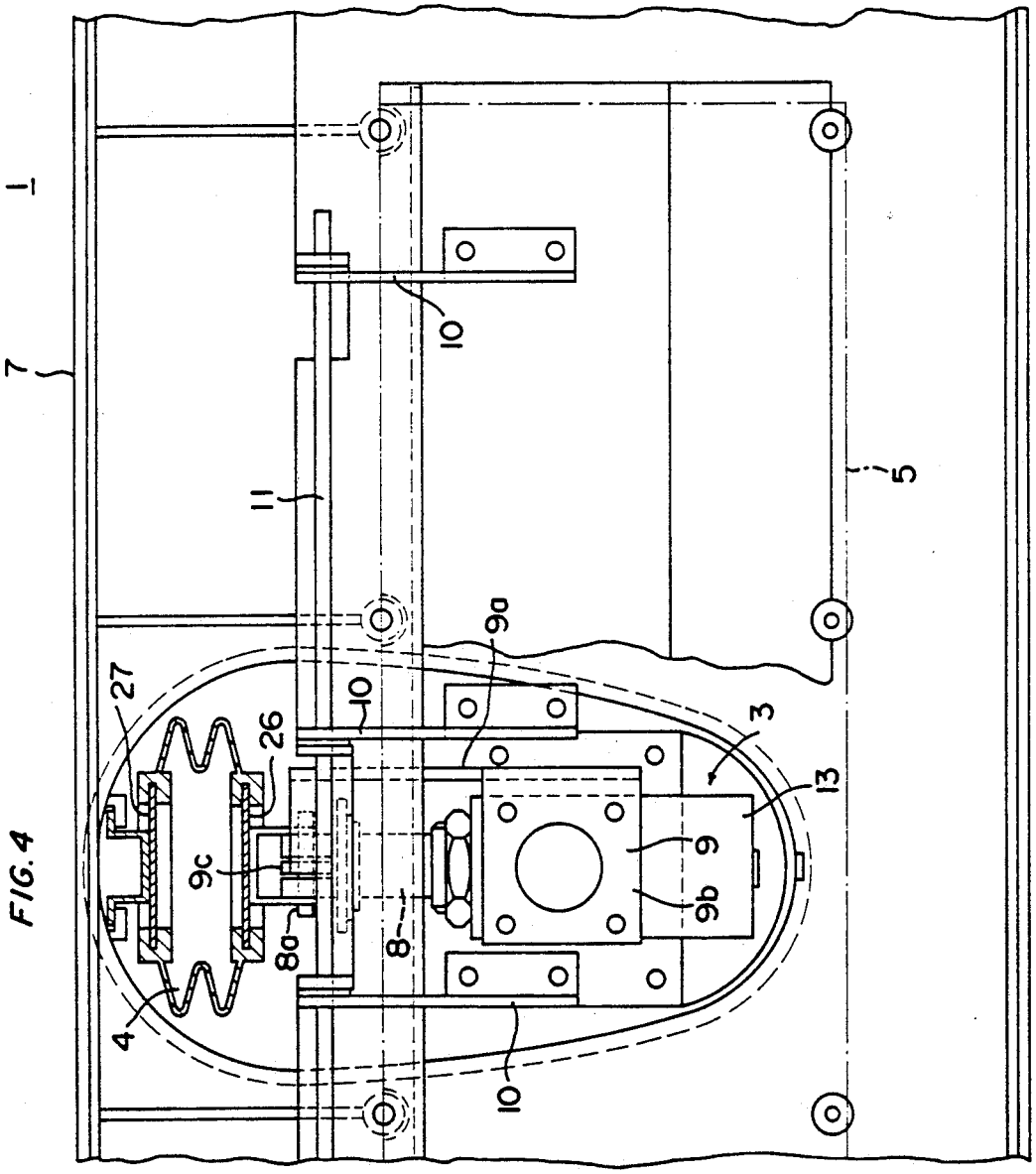
FIG. 4 is a partially internal plan view of a movable plate mounting part.
Figure 5:
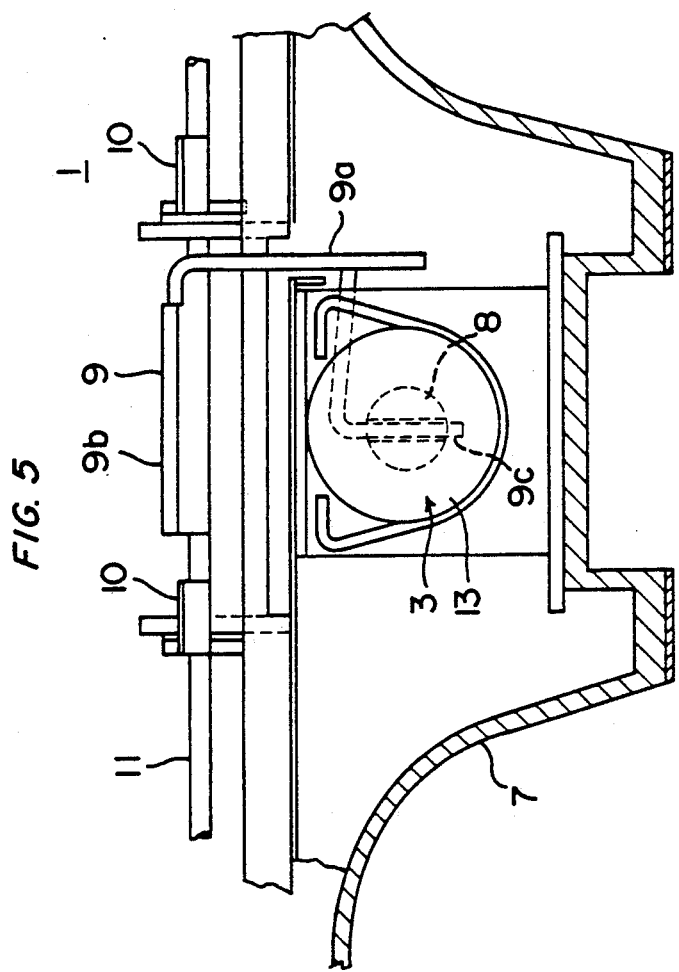
FIG. 5 is a partially vertical sectional view of the movable plate mounting part.

FIGS. 3 to 5 show respectively a detailed construction of the movable plate 5 mounting part, and in which left side of FIG. 3 and upper side of FIG. 4 indicate forward of automobile. Disposed on the movable plate 5 mounting part are a solenoid 3, an air damper 4, the movable plate 5 and the stop lamps 6.

The solenoid 3 is fixed to the frame body 7 under the movable plate 5 and comprises a piston rod 8 moving in axial direction, a return spring (not illustrated) and a coil section 13. The solenoid 3 interlocks the foot brake of automobile. There may be several manners of interlocking, and in one of which signal the lead of the tail lamps of the automobile body interlocking the foot brake is branched and the branched lines are connected to input terminal of the coil section 13. The coil section 13 comprises double-wound two coils of different resistances so as to obtain either of two kinds of magnetic forces, i.e., strong or weak.

The air damper 4 comprises a bellows 25 and closure members 26, 27, and in which the closure member 26 is coupled with the top end of a piston rod 8, while the closure member 27 is fixed to the internal wall surface of the frame body 7. An air intake hole 26a is formed on the closure member 26, and an air valve 15 of elastic material is mounted onto the internal wall of the damper 4 in such a manner as to cover the hole 26a. The air valve 15 is further provided with a hole 15a smaller than the hole 26a at a position facing the hole 26a.

In the mentioned air valve 15 illustrated in FIG. 3, only the upper half thereof is adhered to the internal wall surface of the closure member 26 with an adhesive agent so as to open the air intake hole 26a for taking some air into the damper 4, while closing the air intake hole 26a for exhausting the air from the damper 4 little by little through the small hole 15a.

The piston rod 8 and the movable plate 5 are connected to each other via an arm 9 and a lever 10. The arm 9 comprises a base portion 9a, a horizontal portion 9b and a projecting piece 9c. A slot 9d formed on the projecting piece 9c engages a pin 8a projected on the body of the piston rod 8 and thus, the arm 9 is coupled with the piston 8. The horizontal portion 9b of the arm 9 is secured to the inside surface of the movable plate 5 through stationary plates 20a, 20b. The lever 10 is disposed so as to turn round a support shaft 11 positioned in relation to the frame body 7 and serving as fulcrum, and is secured inside the movable plate 5 through stationary plates 21a, 21b.

The stop lamps 6 are each combined with the lens 12 and mounted on the inside of the movable plate 5. The stop lamps 6 interlock the foot brake in the same manner as the solenoid 3. It is preferable to employ LEDs as the stop lamps 6 in view of their high response speed, superior visibility, economical power consumption, etc., although the stop lamps adopted in the present invention are not limited to LEDs.

In this manner, since the stop lamps 6 are accommodated inside the rear spoiler 1, it is now possible to obtain the rear spoiler 1 having a wing section without sacrificing aerodynamic characteristic.

Described hereinafter are operations of the movable plate 5 and the stop lamps 6.

When driving an automobile normally, the movable plate 5 is located at the solid line position in FIG. 3, and the frame body 7 is closed.

When the driver steps on the foot brake, a current is first supplied to the coil of low resistance of the two coils of the coil section 13 of the solenoid 3 interlocking the foot brake, thereby a strong magnetic force is generated. This magnetic force gives a large driving force to the piston rod 8 being in the stationary state and moves the piston rod 8 in the direction of the arrow f indicated in FIG. 3, whereby the opening action of the movable plate 5 is instantaneously started.

When the piston rod 8 has moved to a predetermined position, then the current is switched to be applied to another coil of high resistance. As the coil of high resistance generates a small magnetic force, the piston rod 8 is decelerated and finally stopped. At this time, the pin 8a formed on the body of the piston rod 8 is shifted to the position 8a' shown in FIG. 3. Accordingly, the arm 9 and the lever 10 turn round the support shaft 11, thereby the movable plate 5 opening itself up to the position indicated by two-dot chain lines.

In this operation, since the current is applied also to the stop lamps 6 mounted on the inside of the movable plate 5 concurrently with the application of current to the solenoid 3, the stop lamps 6 are lit up and their beam light is emitted rearward through the lens 12. Thus, the driver of the succeeding vehicle can visually recognize that the preceding automobile is in braked state.

In the meantime, the air damper 4 secured to the top end of the piston rod 8 takes air into the bellows 25 through the air intake hole 26a.

When the driver releases the foot brake, closing action of the movable plate 5 starts. To be more specific, the stop lamps 6 are put out, and no current is applied to the coil section 13 of the solenoid 3 interlocking the foot brake, thus the piston rod 8 moves back to its original position in the opposite direction of the arrow f by means of the return spring incorporated therein. In this operation, since the air taken into the damper 4 gets out slowly through the small hole 15a provided on the air valve 15, the mentioned returning operation of the piston rod 8 takes place moderately. Accordingly, the movable plate 5 also returns moderately to its original position and closes, since there is no such disadvantage as giving excessive unnecessary shock to components of the stop lamps 6, etc.

Although the present invention has been described in connection with the preferred embodiments thereof, it is to be noted that various changes and modifications are apparent to those who are skilled in the art. Such changes and modifications are to be understood as included within the scope of the present invention as defined by the appended claims, unless they depart therefrom.

For example, the open-and-close mechanism of the movable plate 5 is not limited to the mentioned solenoid and air damper, instead the open-and close operation may be performed by any air cylinder, motor or the like.

What is claimed is:

1. A rear spoiler for use in an automobile comprising:
a movable plate capable of moving between an open position and a closed position, the movably plate forming a part of an upper plate of a main body of the rear spoiler;
a stop lamp secured inside the movable plate, the stop lamp being retracted in the main body of the rear spoiler when the movable plate is in the closed position and protruding from the main body when the movable plate is in the open position;
means for actuating the movable plate to move the movable plate to the open position upon application of a force to a foot brake of the automobile and to move the movable plate to the closed position when the force on the foot brake is removed; and
means for turning the stop lamp on when a force is applied to the foot brake and for turning the stop lamp off when the force on the foot brake is removed.

2. A rear spoiler for use in an automobile according to claim 1, wherein said means for actuating the movable plate includes a solenoid for moving the movable plate to the open position, and a damper for damping movement of the movable plate to the closed position.

3. A rear spoiler for use in an automobile according to claim 1, wherein said stop lamp includes a plurality of LED's.

4. A rear spoiler for use in an automobile according to claim 1, including lenses arranged in front of the LED's.

5. A rear spoiler for use in an automobile according to claim 2, wherein said damper includes a bellows.

6. A rear spoiler for use in an automobile that includes a brake pedal, comprising:
a main body;
a movable plate forming a part of the main body, said movable plate being movable between an open position and a closed position;
a lamp mounted inside the movable plate for emitting light;
actuating means for actuating the movable plate to move to the open position upon operation of the brake pedal and for permitting the movable plate to move to the closed position when operation of the brake pedal ceases; and
means for turning said lamp on upon operation of the brake pedal and for turning said lamp off when operation of the brake pedal ceases.

7. A rear spoiler for use in an automobile according to claim 6, wherein said actuating means includes a solenoid for moving the movable plate to the open position and a damper for damping movement of the movable plate to the closed position.

* * * * *